(12) United States Patent
Madhu et al.

(10) Patent No.: US 10,868,809 B2
(45) Date of Patent: Dec. 15, 2020

(54) ANALYZING FACIAL RECOGNITION DATA AND SOCIAL NETWORK DATA FOR USER AUTHENTICATION

(71) Applicant: SOCURE INC., New York, NY (US)

(72) Inventors: Sunil Madhu, Jersey City, NJ (US); Xinyu Li, Jersey City, NJ (US); Justin Kamerman, Saint John (CA)

(73) Assignee: Socure, Inc., New York, NY (US)

( * ) Notice: Subject to any disclaimer, the term of this patent is extended or adjusted under 35 U.S.C. 154(b) by 123 days.

(21) Appl. No.: 16/179,973

(22) Filed: Nov. 4, 2018

(65) Prior Publication Data

US 2019/0141034 A1    May 9, 2019

Related U.S. Application Data

(63) Continuation of application No. 15/317,735, filed as application No. PCT/US2015/035393 on Jun. 11, (Continued)

(51) Int. Cl.
*G06K 9/62* (2006.01)
*H04L 29/06* (2006.01)
(Continued)

(52) U.S. Cl.
CPC ...... *H04L 63/0861* (2013.01); *G06K 9/00268* (2013.01); *G06K 9/00288* (2013.01);
(Continued)

(58) Field of Classification Search
CPC . G06K 9/00221–2009/00328; G06K 9/00906; G06K 9/00892
See application file for complete search history.

(56) References Cited

U.S. PATENT DOCUMENTS 5,164,922 A    11/1992   Cappelen et al.
5,164,992 A *  11/1992   Turk ................. G06K 9/00241
                                              382/118
(Continued)

FOREIGN PATENT DOCUMENTS

CN    105378790 A    3/2016
EP    2 471 215 A    7/2012
(Continued)

OTHER PUBLICATIONS

Examination Report dated Oct. 31, 2018 for Malaysian Patent Application No. PI 2015002286, 3 pages.
(Continued)

*Primary Examiner* — Brian Werner

(57) ABSTRACT

Tools, strategies, and techniques are provided for evaluating the identities of different entities to protect business enterprises, consumers, and other entities from fraud by combining biometric activity data with facial recognition data for end users. Risks associated with various entities can be analyzed and assessed based on a combination of user liveliness check data, facial image data, social network data, and/or professional network data, among other data sources. In various embodiments, the risk assessment may include calculating an authorization score or authenticity score based on different portions or combinations of the collected and processed data.

18 Claims, 12 Drawing Sheets

Related U.S. Application Data 2015, now Pat. No. 10,154,030, which is a continuation of application No. 14/301,866, filed on Jun. 11, 2014, now Pat. No. 9,147,117.

(51) Int. Cl.
  *G06K 9/00* (2006.01)
  *G06Q 40/02* (2012.01)
  *G06Q 50/00* (2012.01)

(52) U.S. Cl.
  CPC ..... *G06K 9/00335* (2013.01); *G06K 9/00892* (2013.01); *G06K 9/00906* (2013.01); *G06K 9/00979* (2013.01); *G06Q 40/02* (2013.01); *G06Q 50/01* (2013.01); *G06K 2009/00328* (2013.01)

(56) References Cited

U.S. PATENT DOCUMENTS

| | | | |
|---|---|---|---|
| 6,529,864 | B1 | 3/2003 | Chase |
| 8,010,460 | B2 | 8/2011 | Work et al. |
| 8,225,413 | B1 | 7/2012 | De et al. |
| 8,316,086 | B2 | 11/2012 | Ufford et al. |
| 8,457,367 | B1 | 6/2013 | Sipe et al. |
| 8,670,597 | B2 | 3/2014 | Petrou et al. |
| 8,825,759 | B1 | 9/2014 | Jackson et al. |
| 8,856,541 | B1 * | 10/2014 | Chaudhury ............. G06F 21/32 713/186 |
| 8,891,883 | B2 | 11/2014 | Murphy-Chutorian et al. |
| 8,914,454 | B1 | 12/2014 | Kroleski |
| 9,147,117 | B1 * | 9/2015 | Madhu ............... G06K 9/00979 |
| 9,300,676 | B2 | 3/2016 | Madhu et al. |
| 9,558,524 | B2 | 1/2017 | Madhu et al. |
| 9,942,259 | B2 | 4/2018 | Madhu et al. |
| 10,154,030 | B2 * | 12/2018 | Madhu ............... G06K 9/00892 |
| 10,313,388 | B2 | 6/2019 | Madhu et al. |
| 10,542,032 | B2 | 1/2020 | Madhu et al. |
| 2006/0009994 | A1 | 1/2006 | Hogg et al. |
| 2006/0212931 | A1 | 9/2006 | Shull et al. |
| 2010/0333200 | A1 | 12/2010 | Chen et al. |
| 2011/0191200 | A1 | 8/2011 | Bayer et al. |
| 2011/0320342 | A1 | 12/2011 | Kremen et al. |
| 2012/0109802 | A1 | 5/2012 | Griffin et al. |
| 2012/0136866 | A1 | 5/2012 | Carter et al. |
| 2012/0159647 | A1 | 6/2012 | Sanin et al. |
| 2012/0166285 | A1 | 6/2012 | Shapiro et al. |
| 2012/0226579 | A1 | 9/2012 | Ha et al. |
| 2012/0226701 | A1 | 9/2012 | Singh |
| 2012/0278176 | A1 | 11/2012 | Naor et al. |
| 2012/0297477 | A1 | 11/2012 | Raviv |
| 2012/0310831 | A1 | 12/2012 | Harris et al. |
| 2013/0013489 | A1 | 1/2013 | Kremen et al. |
| 2013/0077835 | A1 | 3/2013 | Kritt et al. |
| 2013/0121540 | A1 | 6/2013 | Garcia et al. |
| 2013/0212655 | A1 * | 8/2013 | Hoyos ................. G06K 9/00906 726/5 |
| 2013/0304818 | A1 | 11/2013 | Brumleve et al. |
| 2013/0336547 | A1 | 12/2013 | Komogortsev |
| 2014/0007224 | A1 | 1/2014 | Lu et al. |
| 2014/0041055 | A1 | 2/2014 | Shaffer et al. |
| 2014/0044318 | A1 | 2/2014 | Derakhshani et al. |
| 2014/0099003 | A1 * | 4/2014 | Langley ............. G06K 9/00255 382/115 |
| 2014/0150109 | A1 | 5/2014 | Fire et al. |
| 2014/0063249 | A1 | 6/2014 | Miller et al. |
| 2014/0165178 | A1 | 6/2014 | Perrone et al. |
| 2014/0196110 | A1 | 7/2014 | Rubinstein et al. |
| 2014/0282977 | A1 | 9/2014 | Madhu et al. |
| 2014/0283022 | A1 | 9/2014 | Beloncik et al. |
| 2014/0324719 | A1 | 10/2014 | Canal |
| 2015/0058957 | A1 | 2/2015 | Halliday et al. |
| 2015/0067061 | A1 | 3/2015 | Poston |
| 2019/0014142 | A1 | 1/2019 | Madhu et al. |

FOREIGN PATENT DOCUMENTS

| | | |
|---|---|---|
| EP | 2 973 382 A | 1/2016 |
| WO | WO 2010/109332 A1 | 9/2010 |
| WO | WO 2011/097397 A1 | 8/2011 |
| WO | WO 2014/145431 A1 | 9/2014 |
| WO | WO 2015/191896 A1 | 12/2015 |

OTHER PUBLICATIONS

Extended European Search Report dated Dec. 15, 2017 for European Patent Application No. 15806769.4, 10 pages.
Extended European Search Report dated Oct. 18, 2016 for European Patent Application No. 14763583.3, 10 pages.
Fong, S. et al., "Not Every Friend on a Social Network Can be Trusted: Classifying Imposters Using Decision Trees," Future Generation Communication Technology (FGCT), International Conference on IEEE, pp. 58-63 (Dec. 12, 2012).
International Search Report and Written Opinion dated Aug. 27, 2014 for International Application No. PCT/US14/30197, 8 pages.
International Search Report and Written Opinion dated Sep. 11, 2015 for International Application No. PCT/US2015/035393, 7 pages.
Kollreider, K. et al., "Verifying Liveness by Multiple Experts in Face Biometrics," IEEE Computer Vision and Pattern Recognition Workshops, 6 pages (2008); published online at <http://www2.hh/se/staff/josef/pul/publications/kollreider08anchorage.pdf>.
Office Action dated Jan. 24, 2019 for Chinese Patent Application No. 201480026744.9, 8 pages.
Office Action dated Jun. 28, 2018 for Israeli Patent Application No. 241115 w/English language translation, 7 pages.
Patent Examination Report No. 1 dated Jun. 9, 2016 for Australian Patent Application No. 20142330066, 3 pages.
Patent Examination Report No. 1 dated Oct. 16, 2018 for Australian Patent Application No. 2017228607, 3 pages.
Patent Examination Report No. 2 dated Feb. 22, 2017 for Australian Patent Application No. 20142330066, 3 pages.
Patent Examination Report No. 2 dated Jan. 30, 2019 for Australian Patent Application No. 2017228607, 3 pages.
Written Opinion dated Dec. 7, 2015 for Singapore Patent Application No. 11201507312R, 9 pages.
First Examination Report dated Jan. 22, 2020 for Indian Application No. 9408/DELNP/2015, 7 pages.
Patent Examination Report No. 3 dated May 10, 2019 for Australian Patent Application No. 2017228607, 3 pages.
Patent Examination Report No. 4 dated Sep. 18, 2019 for Australian Patent Application No. 2017228607, 3 pages.
Extended European Search Report dated Sep. 13, 2019 for European Application No. 19186639.1, 7 pages.
Extended European Search Report dated Nov. 26, 2019 for European Application No. 19186638.3, 8 pages.
Communication Pursuant to Article 94(3) EPC dated Feb. 7, 2020 for European Application No. 15806769.4, 6 pages.
Office Action dated Mar. 5, 2019 for Israeli Application No. 249414, with English translation, 6 pages.
Conti, M. et al., "FakeBook: Detecting Fake Profiles in On-line Social Networks," 2012 IEEE/ACM International Conference on Advances in Social Networks Analysis and Mining, 2012 IEEE, pp. 1071-1078.
Fire, M. et al., "Friend or foe? Fake profile identification in online social networks," Soc. Netw. Anal. Min., 4:194 (2014), 23 pages; doi:10.1007/s13278-014-0194-4.

* cited by examiner

ANALYZING FACIAL RECOGNITION DATA AND SOCIAL NETWORK DATA FOR USER AUTHENTICATION

This application is a continuation of U.S. patent application Ser. No. 15/317,735, filed Dec. 9, 2016, which in turn is a U.S. National Stage Entry of International Patent Application No. PCT/US2015/035393, filed Jun. 11, 2015, which is a continuation of U.S. patent application Ser. No. 14/301,866, filed Jun. 11, 2014, now U.S. Pat. No. 9,147,117; the contents of each of the foregoing applications are herein expressly incorporated by reference in their entireties.

BACKGROUND

Identity fraud online is increasing dramatically and continues to be problematic for legitimate consumers and enterprises engaging in online and offline transactions. Consumer fraud costs are rising, and business costs are also increasing at all levels due to this fraudulent activity. Business costs include, but are not limited to, lost revenue, reputation loss, additional resource consumption in terms of labor and review of security procedures, and potential regulatory fines and compensation, among many other types of costs and liabilities. With the advent of the Internet and the rise of social networks, more information is being created today than has ever been created previously in the history of our society. Unfortunately, the ease of availability of personal information freely shared through networked media makes it relatively easy for hackers and people committing fraud to steal user credentials and identity information. This puts consumers, merchants and financial institutions at risk on a global basis.

SUMMARY

Despite these problems, it is essential for many enterprises to have and maintain an online presence in connection with their business operations. Interacting with users from multiple geographic locations, access devices, and/or other access points is typically a requirement for any organization performing or facilitating transactions with users in an online environment. From expanding the reach of an organization in its industry to promoting professional expertise in a field, transactions have to be effectively and efficiently performed through networked media. It is difficult for organizations, enterprises, or professionals to conduct their affairs without a solidly established and well cultivated online presence.

In addressing the foregoing issues, the inventors have recognized a need for more effective computer-implemented tools, strategies, and techniques that can help to authenticate users of computer-based and online systems and to reduce the potential for malicious or fraudulent online activity.

The inventors have also recognized the dissonance that can arise between confirming a person's online identity with data and using biometric confirmation for identifying a real person from a fake person. The inventors have discovered tools and techniques that leverage and combine the best aspects of different methods for online authentication and validation of individuals.

In one aspect, disclosed herein are computer-implemented methods for calculating an authenticity score for a user, the method comprising: calculating, by a facial evaluation system operatively associated with an electronic processor, a liveliness check score in response to analysis of image data associated with at least one anatomical change associated with an interaction between the user and a facial recognition application; calculating, by the facial evaluation system, a facial confirmation score by: generating a facial vector map based on image data associated with the user; collecting data derived from at least one access device associated with the user or at least one identity input associated with the user, and comparing at least a portion of the facial vector map data, the access device data, or the identity input data against at least a portion of image data stored in at least one database; and calculating, by the facial evaluation system, an authorization score for the user in response to the calculated liveliness check score and the calculated facial confirmation score. In some embodiments, the method further comprises collecting the image data associated with the user with a camera-enabled and network connectable access device. In some embodiments, the method further comprises calculating at least one of the liveliness check score or the facial confirmation score in response to a user score calculated by a risk evaluation system. In some embodiments, the method further comprises factoring an opt-out action by the user into the authorization score. In some embodiments, calculating the liveliness check score further comprises recording at least one facial feature of the user in response to recital of a phrase by the user. In some embodiments, the method further comprises calculating the liveliness check score in association with comparing at least one anatomical feature of the user shown in the image data to at least a portion of an expected set of anatomical features associated with the user. In further embodiments, the anatomical feature includes at least one of eye blinking, eye movement, head motion, lip movement, arm gesture, hand gesture, or a combination thereof. In some embodiments, the method further comprises analyzing at least a portion of the identity input data to verify the user against a category of known users. In some embodiments, the method further comprises: calculating, by a risk evaluation system operatively associated with an electronic processor, a user score in response to at least a portion of profile data associated with at least one social network or professional network associated with a user account; and combining the calculated user score, the calculated liveliness check score, and the calculated facial confirmation score to generate an overall authenticity score for the user. In further embodiments, the method further comprises calculating a connections score in response to at least one connection formed between a first user account and at least a second user account through the social network or professional network. In still further embodiments, the method further comprises calculating an affinity score in response to an overlap between at least a portion of the profile data of a first user account and at least a portion of profile data associated with at least a second user account. In further embodiments, calculating the user score further comprises processing at least one activity feed of at least the first user account by calculating a frequency of posting. In further embodiments, processing the activity feed includes identifying a baseline posting frequency and a burst usage pattern for at least the first user account. In further embodiments, the method further comprises checking an identity of one or more user accounts making a post to distinguish between a post by a first user account and a post by at least a second user account connected to the first user account. In further embodiments, the method further comprises collecting metadata associated with at least one post including a location accessed by the user account. In still further embodiments, the method further comprises using the collected location metadata to track one or more frequently traveled locations of the user account. In further embodiments, calculating the user score further comprises comparing at least a portion of the data of the user account to at least one fake profile model associated with at least one social network or professional network.

In another aspect, disclosed herein are computer-implemented systems for calculating an authenticity score for a user, the system comprising a facial evaluation system operatively associated with an electronic processor; the facial evaluation system programmed for: calculating a liveliness check score in response to analysis of image data associated with at least one anatomical change associated with an interaction between the user and a facial recognition application; calculating a facial confirmation score by: generating a facial vector map based on image data associated with the user, collecting data derived from at least one access device associated with the user or at least one identity input associated with the user, and comparing at least a portion of the facial vector map data, the access device data, or the identity input data against at least a portion of image data stored in at least one database; and the facial evaluation system programmed for calculating an authorization score for the user in response to the calculated liveliness check score and the calculated facial confirmation score. In some embodiments, the system further comprises: a risk evaluation system operatively associated with an electronic processor, the risk evaluation system programmed for calculating a user score in response to at least a portion of profile data associated with at least one social network or professional network associated with a user account; and a module programmed for combining the calculated user score, the calculated liveliness check score, and the calculated facial confirmation score to generate an overall authenticity score for the user.

In yet another aspect, disclosed herein are non-transitory computer-readable medium including instructions for directing an electronic processor of a computer system to perform a method for calculating an authenticity score for a user, the medium comprising: instructions for calculating a liveliness check score in response to analysis of image data associated with at least one anatomical change associated with an interaction between the user and a facial recognition application; instructions for calculating a facial confirmation score by: generating a facial vector map based on image data associated with the user, collecting data derived from at least one access device associated with the user or at least one identity input associated with the user, and comparing at least a portion of the facial vector map data, the access device data, or the identity input data against at least a portion of image data stored in at least one database; and instructions for calculating an authorization score for the user in response to the calculated liveliness check score and the calculated facial confirmation score. In some embodiments, the medium further comprises instructions for collecting the image data associated with the user with a camera-enabled and network connectable access device. In some embodiments, the medium further comprises instructions for calculating at least one of the liveliness check score or the facial confirmation score in response to a user score calculated by a risk evaluation system. In some embodiments, the medium further comprises instructions for factoring an opt-out action by the user into the authorization score. In some embodiments, calculating the liveliness check score further comprises recording at least one facial feature of the user in response to recital of a phrase by the user. In some embodiments, the medium further comprises instructions for calculating the liveliness check score in association with comparing at least one anatomical feature of the user shown in the image data to at least a portion of an expected set of anatomical features associated with the user. In further embodiments, the anatomical feature includes at least one of eye blinking, eye movement, head motion, lip movement, arm gesture, hand gesture, or a combination thereof. In some embodiments, the medium further comprises instructions for analyzing at least a portion of the identity input data to verify the user against a category of known users. In some embodiments, the medium further comprises instructions for: calculating, by a risk evaluation system operatively associated with an electronic processor, a user score in response to at least a portion of profile data associated with at least one social network or professional network associated with a user account; and combining the calculated user score, the calculated liveliness check score, and the calculated facial confirmation score to generate an overall authenticity score for the user. In further embodiments, the medium further comprises instructions for calculating a connections score in response to at least one connection formed between a first user account and at least a second user account through the social network or professional network. In still further embodiments, the medium further comprises instructions for calculating an affinity score in response to an overlap between at least a portion of the profile data of a first user account and at least a portion of profile data associated with at least a second user account. In further embodiments, calculating the user score further comprises processing at least one activity feed of at least the first user account by calculating a frequency of posting. In further embodiments, processing the activity feed includes identifying a baseline posting frequency and a burst usage pattern for at least the first user account. In further embodiments, the medium further comprises instructions for checking an identity of one or more user accounts making a post to distinguish between a post by a first user account and a post by at least a second user account connected to the first user account. In further embodiments, the medium further comprises instructions for collecting metadata associated with at least one post including a location accessed by the user account. In still further embodiments, the medium further comprises instructions for using the collected location metadata to track one or more frequently traveled locations of the user account. In further embodiments, calculating the user score further comprises comparing at least a portion of the data of the user account to at least one fake profile model associated with at least one social network or professional network.

BRIEF DESCRIPTION OF THE DRAWINGS

The utility of the embodiments of the invention will be readily appreciated and understood from consideration of the following description of the embodiments of the invention when viewed in connection with the accompanying drawings, wherein.

DETAILED DESCRIPTION OF THE INVENTION

In various embodiments, the invention offers tools, strategies, and techniques for evaluating the identities of different entities to protect individual consumers, end users, business enterprises, and other organizations from social identity theft and fraud. Risks associated with other entities can be assessed and processed based on analysis of facial recognition data, social networking data, and/or a combination of multiple data sources, for example.

Figure 1:
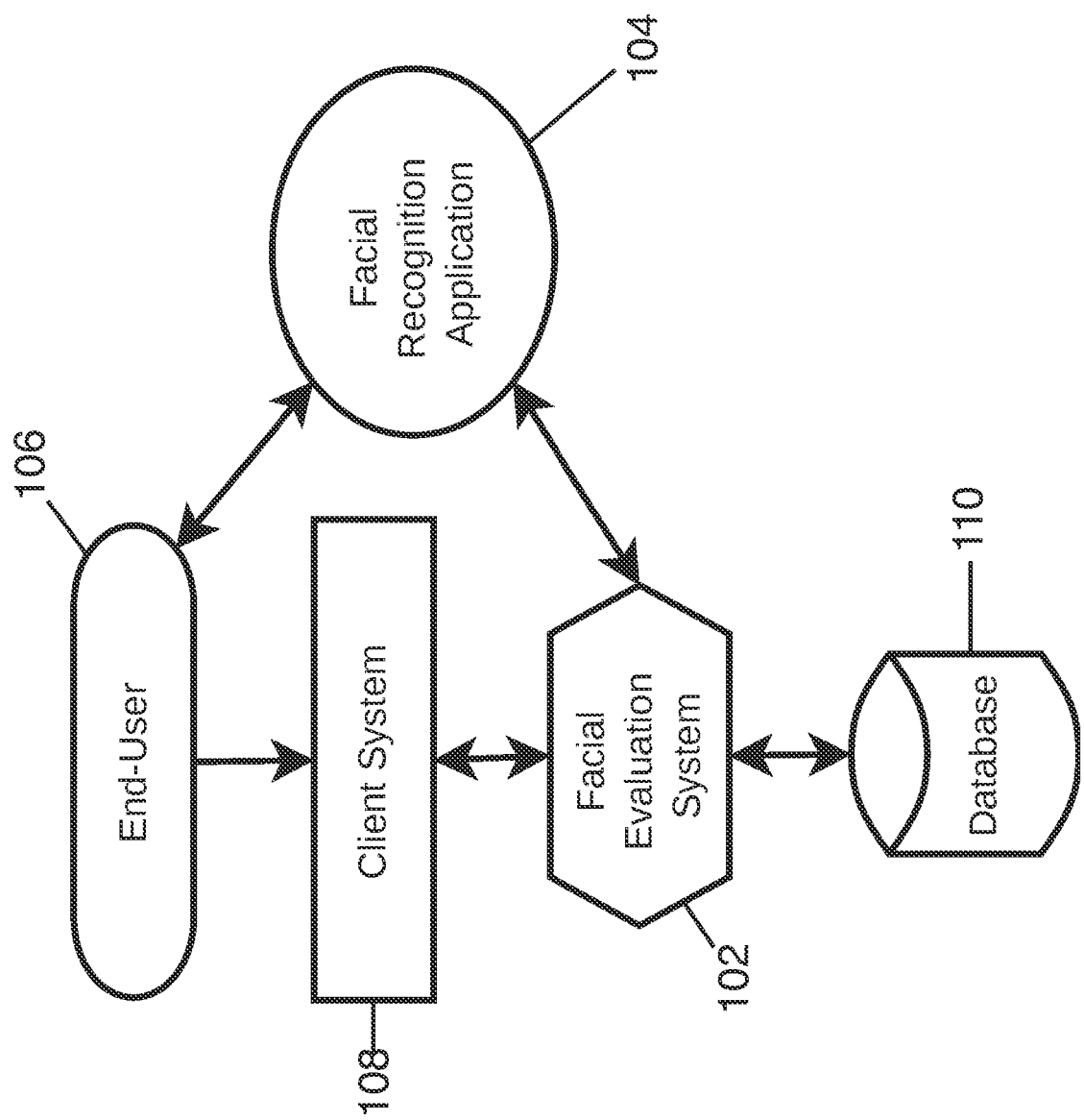
FIG. 1 includes an overview of various process embodiments of the invention which employ a facial evaluation system.
Figure 2:
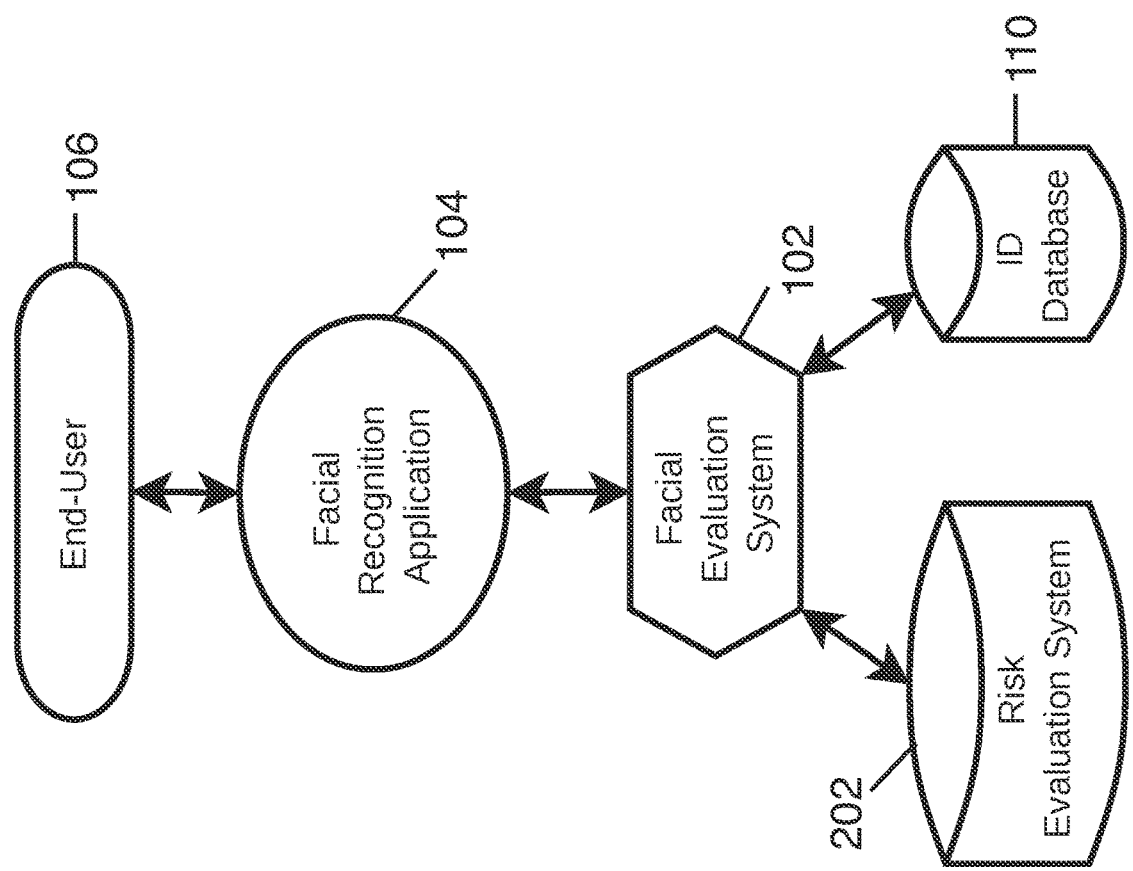
FIG. 2 includes an overview of various process embodiments of the invention which employ a facial evaluation system and a risk evaluation system.

FIGS. 1 and 2 provide an overview of various process aspects and system components associated with certain embodiments of the invention. As shown, a facial evaluation system 102 can be programmed to communicate and/or execute a facial recognition application 104 in association with one or more end users 106. In one scenario, the end user 106 may attempt to interface with or access a client system 108; such as to perform a variety of online transactions.

In various embodiments, the client system 108 may be associated with an entity or enterprise involved in many different areas of online transaction or authorization, including but not limited to: financial services, payments, electronic commerce, gaming, merchant services, government services, and/or many other kinds of computer systems or services requiring identity verification or user authentication.

The facial evaluation system 102 can be programmed to generate an authorization score which can be applied to approve or deny the end user 106 for a specific transaction (e.g., by value, by item, by service, and/or by risk level). For example, users 106 with a comparatively lower but still positive authorization score may be allowed to continue with a transaction involving comparatively lower risk, while users 106 with a comparatively higher authorization score may be allowed to engage in comparatively higher value and higher risk transactions. In certain embodiments, an authenticity score calculated by a risk evaluation system 202 may be used and combined with user 106 information to enhance, complement, or replace an authorization score calculated by the facial evaluation system 102, for example.

The facial recognition application 104 can be employed to assess the identity of the user 106 by capturing data representative of interactions between the user and the application 104, which can be executed on an access device of the end user 106, for example. In one example, the interaction between the user 106 and the facial recognition application 104 may include presenting a text portion to be read by the user 106. The application 104 can be programmed to capture data indicative of the liveliness of the user 106 as the user 106 reads the presented text, for example. The liveliness analysis may involve determining whether the lips of the user 106 are moving sufficiently synchronously with the text as the text is read on a screen display, for example, and/or determining if one or both eyes of the user 106 are sufficiently tracking the text as it moves across a screen display generated by the application 104. It can be seen that executing such liveliness check analysis through the application 104 may reduce or eliminate the need for a user 106 to conduct localized device training of facial image data to familiarize the user 106 with a particular access device, for example. The application 104 may also gather a unique identifier or other identity data associated with the user 106 (e.g., a device serial number or an e-mail address) and/or image data associated with the user 106 that can be used to generate a facial vector map, for example.

The results of the liveliness analysis, the unique identifier data, and/or the user 106 image data may be communicated to the facial evaluation system 102 for further processing. For example, the unique identifier and/or the facial vector map can be compared against data stored in one or more data storage media 110 associated with the facial evaluation system 102 in an effort to confirm the identity or authenticity of the user 106. For example, one or more elements of various photographic images stored in the database 110 may be compared against the generated facial vector map, and a score may be generated as a result of the comparison. An authorization score can then be calculated based on the processing performed by the facial evaluation system 102. In response to receiving the calculated authorization score from the facial evaluation system 102, the client system 108 may or may not complete a transaction or provide access to the user 106, and/or may request additional information regarding the user 106.

With reference to FIG. 2, the facial evaluation system 102 may be programmed to communicate with one or more kinds of risk evaluation systems 202 to generate an authenticity score or other indications of the validity of a given user 106. For example, if the authorization score calculated in connection with operation of the facial evaluation system 102 is deemed insufficient by itself to validate or authenticate the user 106, then an authenticity score calculated by the risk evaluation system 202 may use in place of, or as a complement to, the authorization score. In certain embodiments, an enhanced authenticity score can be calculated by combining an authorization score calculated by a facial evaluation system 102 with an authenticity score calculated by a risk evaluation system 202. In one example, achieving a predetermined threshold authorization score may indicate or trigger the need or desire to complement the authorization score with an authenticity score calculated by the risk evaluation system 202 (or vice versa). In another example, if insufficient data is obtained by the facial evaluation system 102, such as if the user 106 opts out of the analysis, then the risk evaluation system 202 may be employed to attempt to authenticate or authorize the user 106.

Various embodiments of the invention may leverage camera technology for verifying both the actual presence of a user and a given user's identity. Occurring in tandem with the rise of reliance of online identity is the proliferation and use of various access devices, in static and mobile forms, that can take photographs, record video, and transmit video or visual data. Transmission destinations may include centralized networks, such as social networks, and decentralized networks, such as one-to-one video chat services. When such image data are combined with other information, including data from social networks, for example, an enhanced and more accurate technique for performing online identity verification or authentication emerges. It can be seen that this creates value for consumers, enterprises, and any group, party, or body that engages in online transactions. In various embodiments, techniques for multi-factor verification, biometric identification, and offline identity lookups can be advantageously leveraged and combined in different ways to promote confirmation of online identity.

It can be appreciated that the tools, techniques, and strategies represented by various embodiments of the invention described herein can be beneficial to various users, businesses, or other entities. In certain embodiments, risk evaluation systems can be configured to scan, aggregate, and organize social networking data and other network data to generate a social graph that provides feedback through an infographic profile. In this manner, the user can be alerted as to what data needs to be corrected or otherwise addressed. Users can employ the social graph as a feedback loop to remediate data privacy issues, address vulnerability issues, and perhaps improve scores derived from the social graph to obtain the best possible online resume. Through the evaluation system, users can be informed when links on their network connections, their friends' network connections, their business connections, and/or their professional connections represent a threat.

In various embodiments, the invention may involve evaluating risk of financial fraud or identity theft by employing social graph and financial behavioral patterns, for example. In various embodiments, the invention can incorporate data related to social behavior into the mix of measures used to detect and avoid fraud, which has the potential to reduce losses to financial institutions, businesses, individuals, and other entities. In addition, a consumer's experience can be improved by significantly enhancing the authentication process and reducing false positive friction.

In various embodiments, the invention can provide a scalable solution and tools that businesses and individuals can use to protect the privacy of their data and to enhance their reputations in various online environments. Examples of these online environments include social networking sites (e.g., Facebook, Twitter, etc.), professional networking sites (e.g., Linkedin), and/or other web-based or online environments. In certain embodiments, the evaluation systems described herein may be implemented to combat the growing risk of identity theft and related fraud in a social and mobile device world. In certain aspects of the invention; an authenticity score and associated algorithms can be provided as a robust anti-fraud model that combines consumer social behaviors with spending patterns across credit, debit and ACH transactions, for example. In one example, secure web-services can be exposed that financial institutions may consume in their transaction flows to improve their siloed financial fraud risk models and thereby reduce fraud losses, user experience friction, and fraud remediation costs.

Figure 3A:
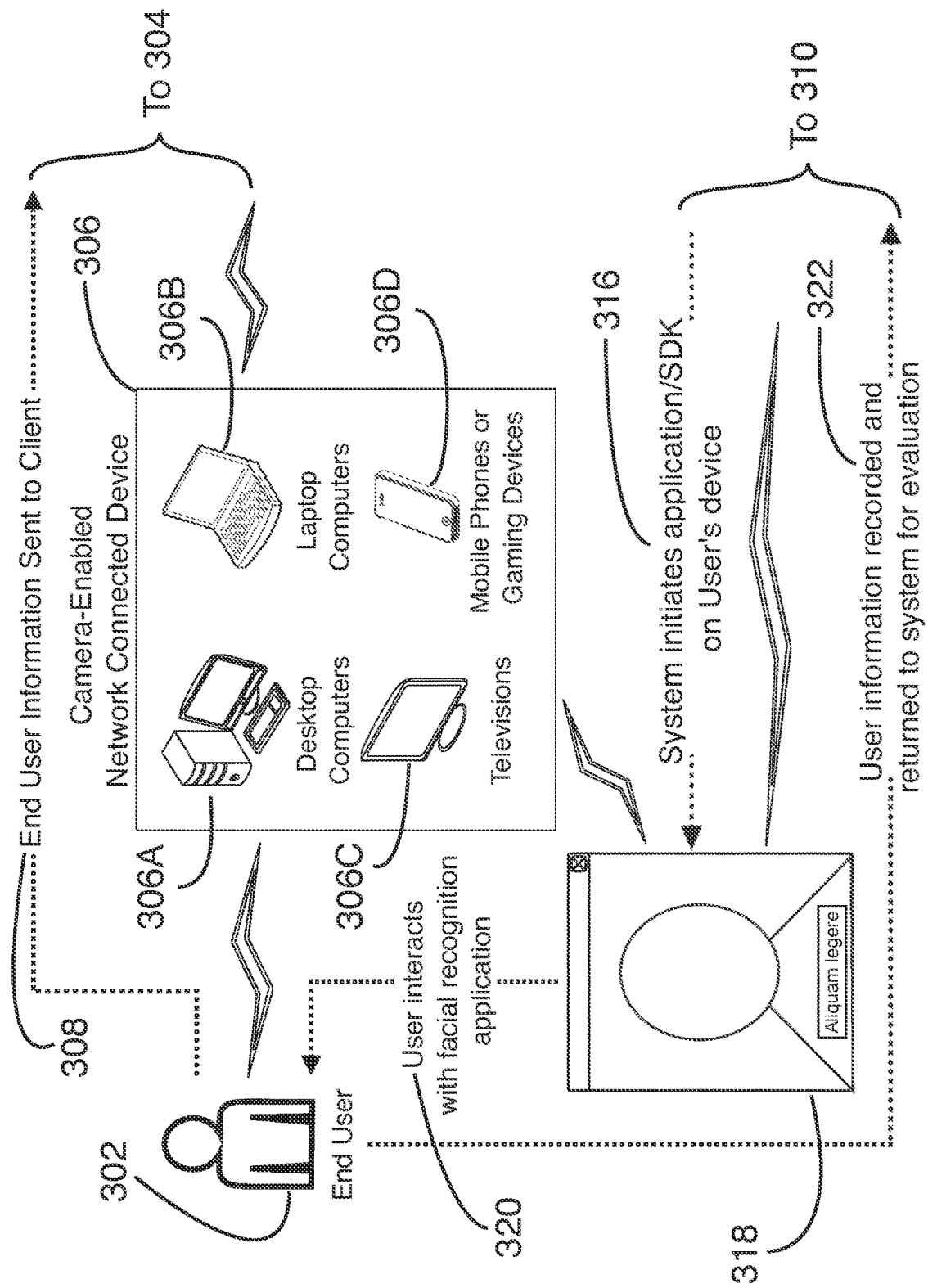
FIGS. 3A and 3B include examples of a process flow and a computer system architecture that may be structured in accordance with various embodiments of the invention.
Figure 3B:
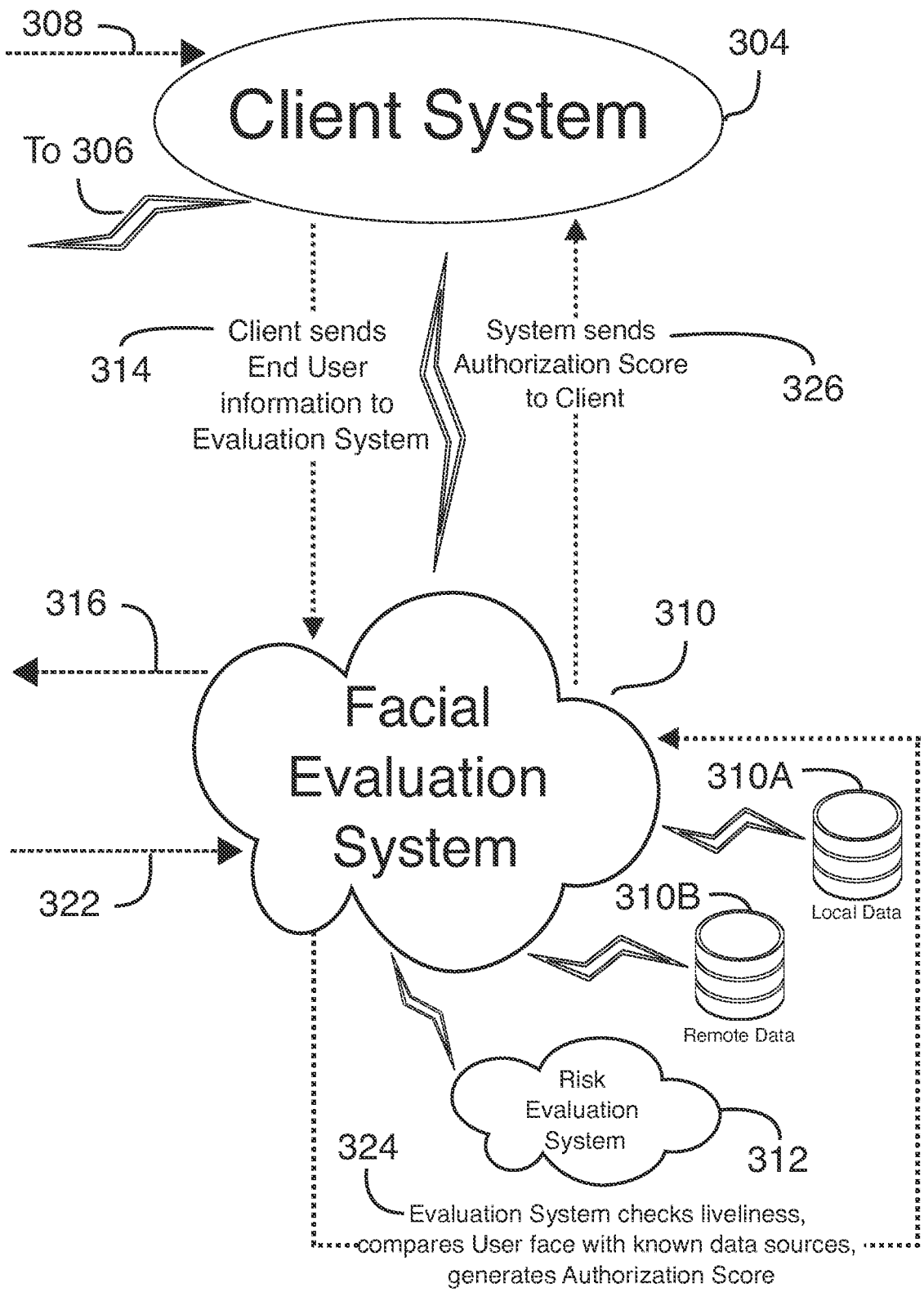

FIG. 3 includes an example of a process flow and an example of a computer system architecture that may be structured in accordance with various embodiments of the invention. In the examples shown, an end user 302 communicates with a client system 304 through one or more types of access devices 306. In one scenario, the client system 304 may be a commercial entity seeking to authenticate a new end user 302 at the account creation stage, for example. During the communication, the client system 304 may request various information from the end user 302, such as first name, last name, email address, social media tokens, address, etc., which can be communicated back to the client system 304 at step 308. In various embodiments, a unique device identifier, for example, may be generated based on available environmental variables and parameters associated with the access device 306 and/or the user 302. Such identifiers may include, for example and without limitation, device brand, model number, serial number, hardware ID, CPU, IP address, SIM ID, MAC address, gee-location, preferred browser, and/or application settings, among many others. This information may be used by a facial evaluation system 310 and/or a risk evaluation system 312 to verify the identity of a particular user 302 based on a category of known users 302. User categories might include known acceptable users 302 (a.k.a. "white list") and known unacceptable users 302 (a.k.a. "black list"), for example.

The access devices 306 may include, for example and without limitation, desktop computer 306A, laptop computer 306B, televisions 306C, and/or mobile phones or gaming devices 306D, among many other types of access devices 306. In certain embodiments, the access devices 306 may be provided as various kinds of camera-enabled and network connected or connectable devices, for example. The access device 306 may include an electronic device enabled with an active camera, network connectivity, and storage capabilities to run customized applications and/or a web browser. The client system 304 may be comprised of one or more types of computer systems, modules, or other components programmed with computer-executable instructions to communicate information with the access devices 306 through a networked medium, for example.

At step 314, the client system 304 may communicate information associated with the end user 302 to the facial evaluation system 310 for further analysis and processing of the end user 302 information. In various embodiments, the evaluation system 310 may include one or more, computer processors, modules, components, or sets of instructions programmed to analyze facial or anatomical data. In certain embodiments, the evaluation system 310 may include one or more operatively associated data storage media programmed to store, compare, or retrieve data associated with local data storage media 310A or remote data storage media 310B containing information associated with various end users 302, for example.

At step 316, the facial evaluation system 310 may cause a facial recognition application 318 (e.g., which may be a software development kit or "SDK" application) to be initialized on an access device 306 of the end user 302. In various embodiments, the end user 302 may be required to opt-in to continue the verification process. At step 320; the end user 302 may interact with the facial recognition application 318. If the user 302 opts-out of the process, however, then execution of the facial recognition application 318 may be halted. However, such an opt-out action by the end user 302 may be recorded by the evaluation system 310 and may be factored into calculating an authorization score and/or authenticity score for the end user 302 as indicative of potentially fraudulent activity. In various embodiments, activation and execution of the application 318 can occur through one or more types of messaging protocols used to communicate with any camera-enabled communication device or access device 306. For example, a suitable transport protocol may include SMS, MMS, TCP/IP, HTTP/HTTPS, or others.

Figure 4:
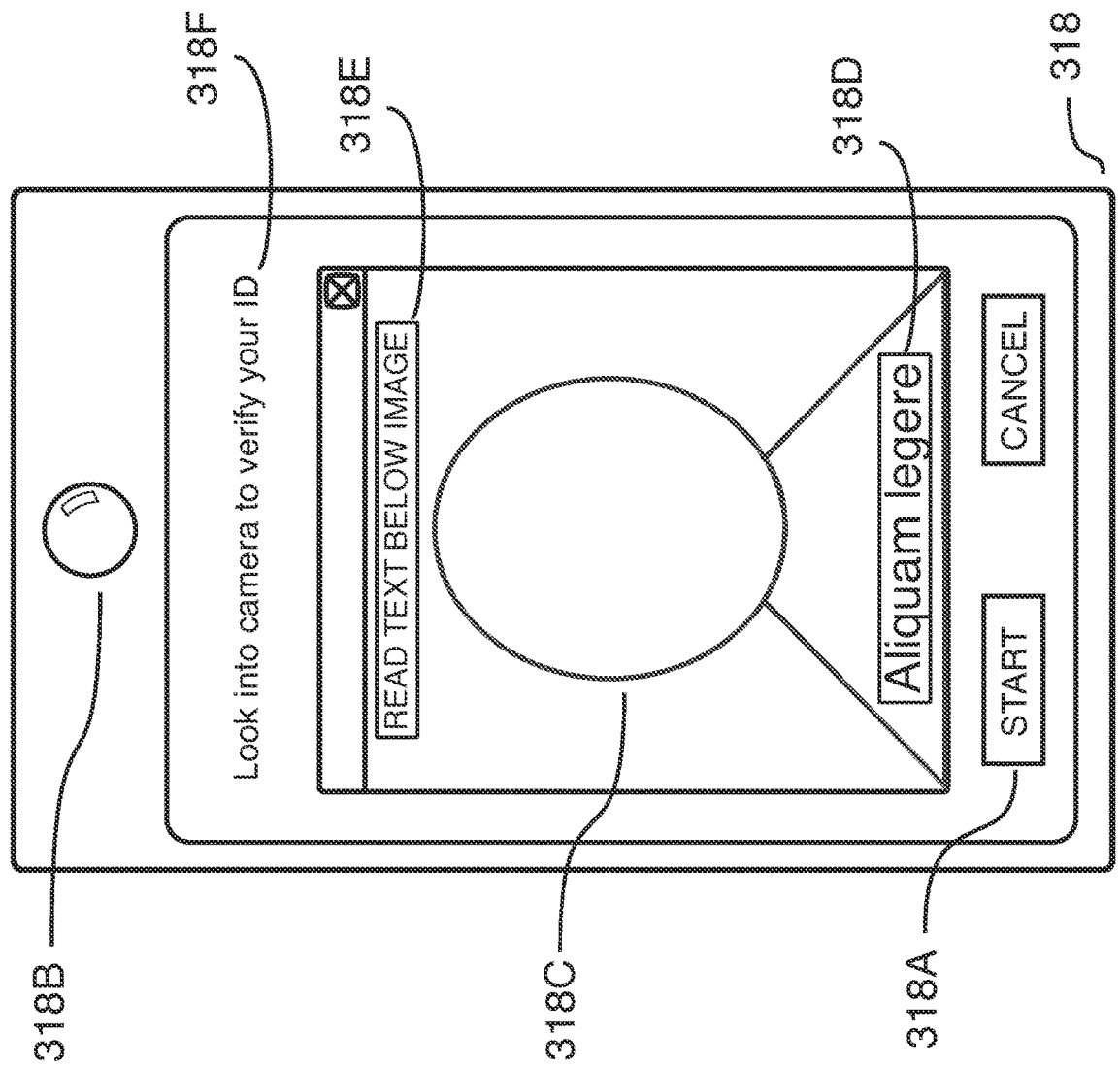
FIG. 4 includes an example of an access device screen display programmed for executing a facial recognition application in accordance with various embodiments of the invention.

With reference to FIGS. 3 and 4, a successful opt-in by the user at step 320, such as by selecting a "start" button 318A can execute the facial recognition application 318. In various embodiments, the application 318 may employ a camera 318B operatively associated with the access device 306, for example. In operation, the user 302 can present anatomical features (e.g., head and shoulders) to the camera 318B, for example, to generate an image in a frame 318C to demarcate the face image of the user 302. When anatomical features of the user 302 are sufficiently aligned within the frame 318C, then a randomly generated phrase or sentence 318D can be displayed to the user 302. The application 318 may be programmed to instruct the user 302 to read the phrase 318D aloud after a countdown period, for example, such as approximately two or three seconds. The application 318 may be programmed to record a video of the user 302 saying the phrase 318D, while recording facial features or other anatomical changes of the user 302 during the recital of the phrase 318D. In various embodiments, a progress bar 318E may reflect capture of a video loop including the facial data changes or other anatomical changes made by the user 302, for example. In certain embodiments, a pop-up window 318F including various features of the application 318 may be programmed to disappear after the video has been captured, such as after acquisition of sufficient data for performing a liveliness check has been completed by the application 318.

At step 322, the recorded facial recognition data and/or other user 302 information may be communicated to the facial evaluation system 310 for further analysis. If the transmission of the recording has been successfully accomplished, the application 318 can be un-initialized on the access device 306 of the user 302. At step 324, image data contained within the recording can be parsed and analyzed by the evaluation system 310 for performing a facial confirmation analysis and/or for performing a liveliness check based on user 302 recital of the phrase 318D. In certain embodiments, facial confirmation can be performed by comparing the face image data of the user 302 with a known database of image data associated with probable users 302, perhaps based on information provided by the client system 304 from the user 302, for example. Information used for the comparison may be derived from available sources such as social media networks, public databases, and/or private online databases, among other data sources 310A, 310B. Liveliness can be checked by comparing the actual facial features or other anatomical features of the user 302 shown in the video recording, for example, and matching or comparing changes in the facial features to an expected set of facial features associated with the phrase 318D recited by the user 302. In various embodiments, the application 318 may ask the user to interact with the camera 318B in a variety of ways to check for liveliness. For example, user 302 actions subject to such liveliness checks may include, without limitation, blink detection, eye tracking, head motion, lip movement, and/or arm or hand gestures, among other indicators of anatomical motion occurring within the time frame of the given video or animation segment.

In various embodiments, data obtained from the liveliness check may be processed by the application 318 on the computing device 306 or may be transmitted to the facial evaluation system 310 for processing and analysis. The analysis of the liveliness check may include applying a score along a spectrum ranging from not live, to possibly live, and then to live. In various embodiments, the liveliness check analysis can be factored into one or more other authenticity scores, for example, generated by the risk evaluation system 312 (as described in more detail below). Information gathered on the access device 306 may be compressed before transmission. This may occur via a method for compression, common or uncommon, new or standard, as understood by those skilled in the art. The compression may occur in the form of encryption. After processing, the information can be transmitted to the facial evaluation system 310 via an encrypted communication. Encryption may occur on the data, through the transmission method, or both. The evaluation system 310 may be programmed to obtain information from the access device 306 and then decrypt the data for further analysis.

In various embodiments, processing of image data to perform a facial confirmation analysis, for example, may include extracting image data associated with various facial features to create a facial matrix composition or facial vector map associated with the user 302. One or more key frames from the recorded video or animation may be extracted, inspected, and analyzed for matching the user 302 to appropriate corresponding data which can be accessed by the facial evaluation system 310. In certain embodiments, user 302 profile information and other data communicated to the evaluation system 310 can be looked up either through online sources 310B or from a local store 310A of relevant information. For example, an algorithm may be programmed and executed to determine whether the face shown for the user 302 is an appropriate face upon which to base a comparison. The system 310, using a computer processor, may extract relevant facial features from the given image. These features can be placed into a facial vector map for each image entered for analysis. This vector map may be stored and used in later searches performed by the system 310. The system 310 can then compare the sent image vectors with the vectors of the relevant images found in the local and/or online image search. In various embodiments, the algorithm used for such facial confirmation analysis may be based partially or entirely on the Local Binary Patterns (LBP) method, the Eigenface method, and/or any other suitable algorithm or method, deep learning architecture, neural network learning system, or other method used for facial recognition known to those skilled in the art. It can be seen that the system 310 can be programmed to use data from the access devices 306 and user 302 identity inputs along with the facial vector map data to compare against an index of known faces in the corpus of face data maintained or accessed by the system 310, such as in the databases 310A, 310B. A facial confirmation score may be generated based on comparison of the accumulated specific facial vectors. For example, the facial confirmation score can be tied to a set of categories (e.g., high, medium, low, none, etc.) in response to a degree of correlation between different sets of image data, or the score may be assigned as a numerical value within a range (e.g., 0-10).

As part of a request made by the client system 304, or perhaps in response to a rule triggered in the facial evaluation system 310, for example, it can be determined that additional biometric information is required or desirable to assess the authenticity of the end user 302. For example, a confirmation can activate the application 318 through the facial evaluation system 310 based on the results of, or subsequent to, performing an initial social-based identity verification process with the risk evaluation system 312 (see below). Such activation may include connecting to a remote web site, activating another specific application installed on the device 306, and/or executing another method for enabling camera input and transmission to interact with the end user 302. In various embodiments, verifying transactions may be initiated by, an appropriate validating facility, perhaps through an authorized third party or through the evaluation system 310.

Figure 5A:
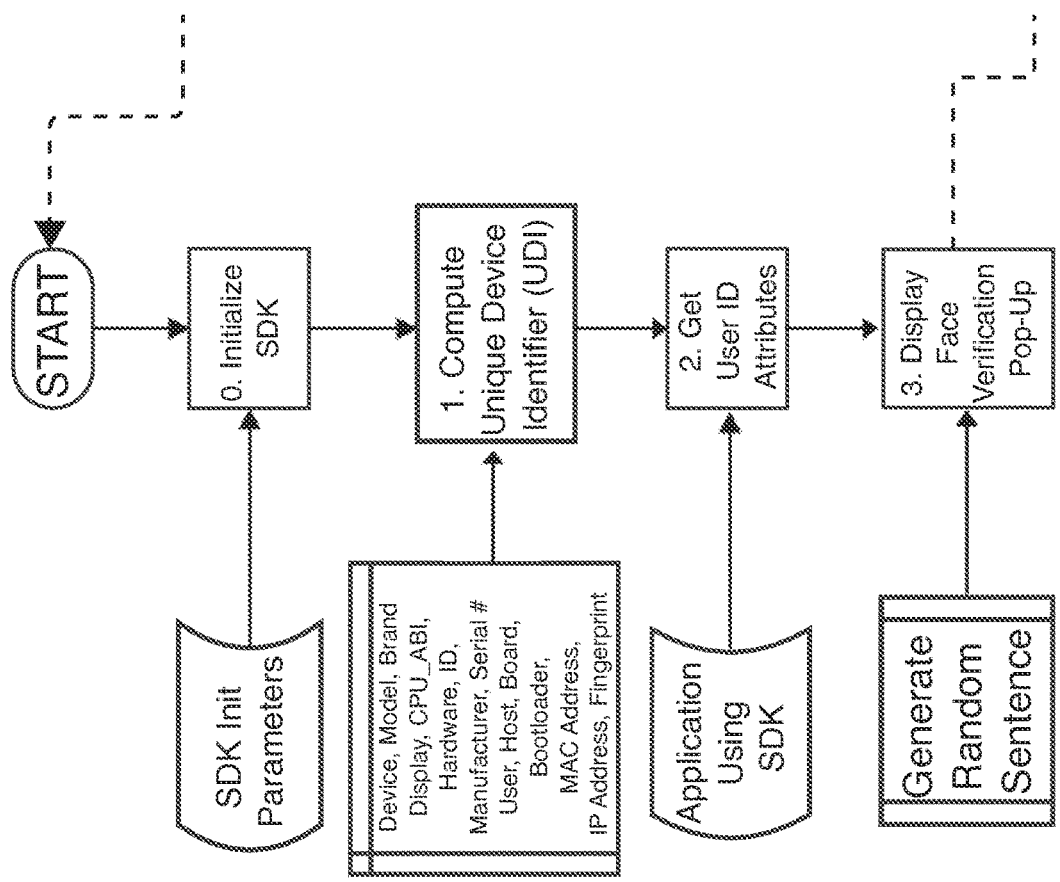
FIGS. 5A and 5B include a process flow diagram illustrating an example of a process flow involving execution of a facial recognition application in association with various embodiments of the invention.
Figure 5B:
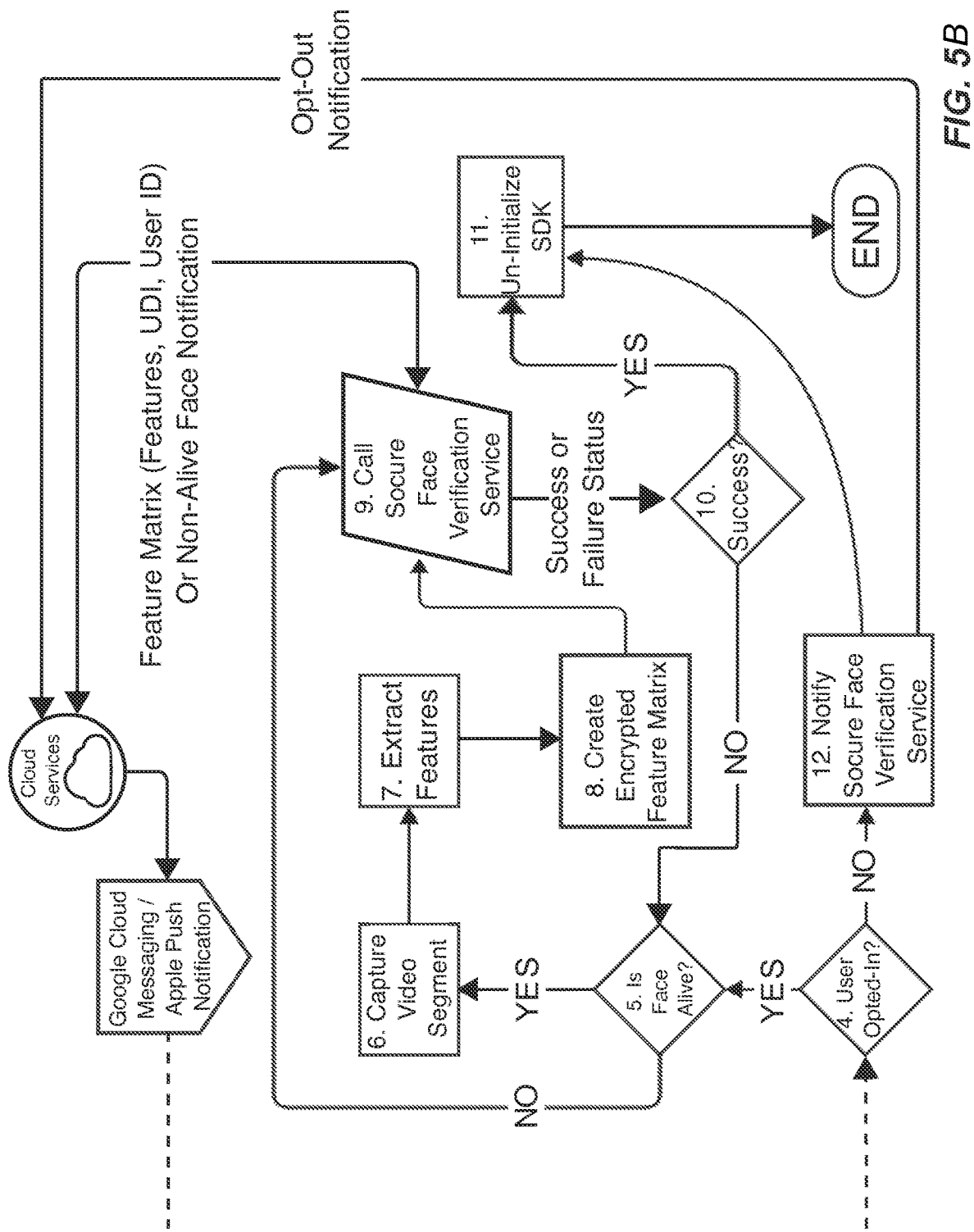
Figure 6:
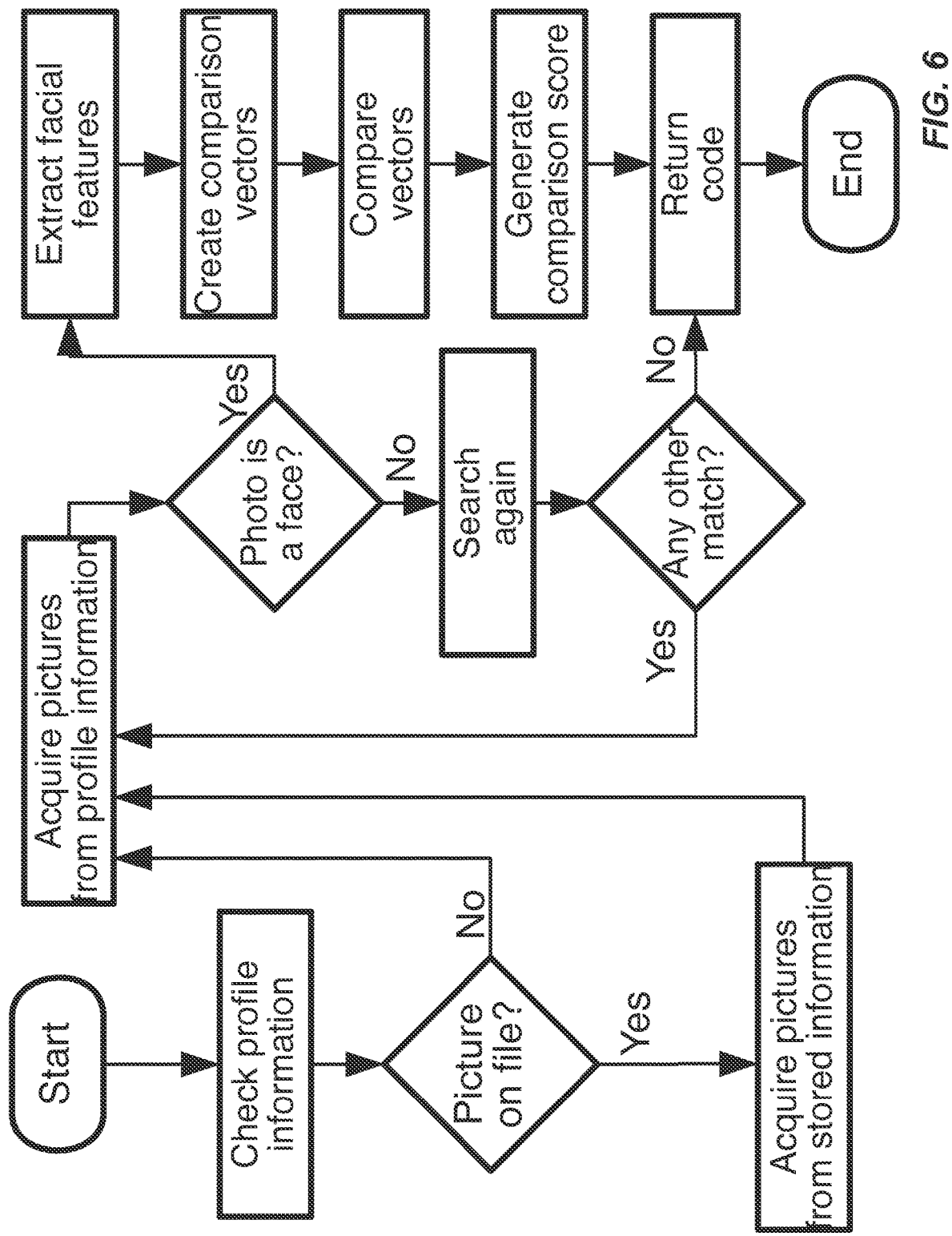
FIG. 6 includes a process flow diagram illustrating an example of a process flow involving analysis of facial image data by an evaluation system in association with various embodiments of the invention.

FIG. 5 illustrates an example of a process flow involving execution of the application 318, including initializing the application 318, performing liveliness checks, and creating a facial vector map for a given user 302. FIG. 6 includes an example of a process flow including evaluation of facial image data processed by the facial evaluation system 310 for comparison against a facial vector map, for example.

Referring again to FIG. 3, at step 324 the liveliness check score and/or the facial confirmation score may be factored by the facial evaluation system 310 to generate an authorization score. At step 326, the facial evaluation system 310 may communicate a response to the client system 304 with an authorization score. In one example, the authorization score may be between 0 and 10 with a variable scale to determine general levels of authenticity, confirming that the user 102 can be designated as authentic (e.g., a score from 6-10); fraudulent (e.g., a score from 0-4); or unknown (e.g., a score of 5). Based on receiving and reviewing the authorization score, the client system 304 may proceed with the transaction with the user 302, may elect not to proceed with the transaction with the user 302, or may request additional information. For example, one or more authenticity scores generated by the risk evaluation system 312 may be combined in various ways with the authorization score calculated by the facial evaluation system 310 to yield an overall authenticity score for the user 302. The overall authenticity score may be communicated to the client system 304 to assist with further deliberation regarding whether or not to engage in a transaction with the user 302.

Figure 7:
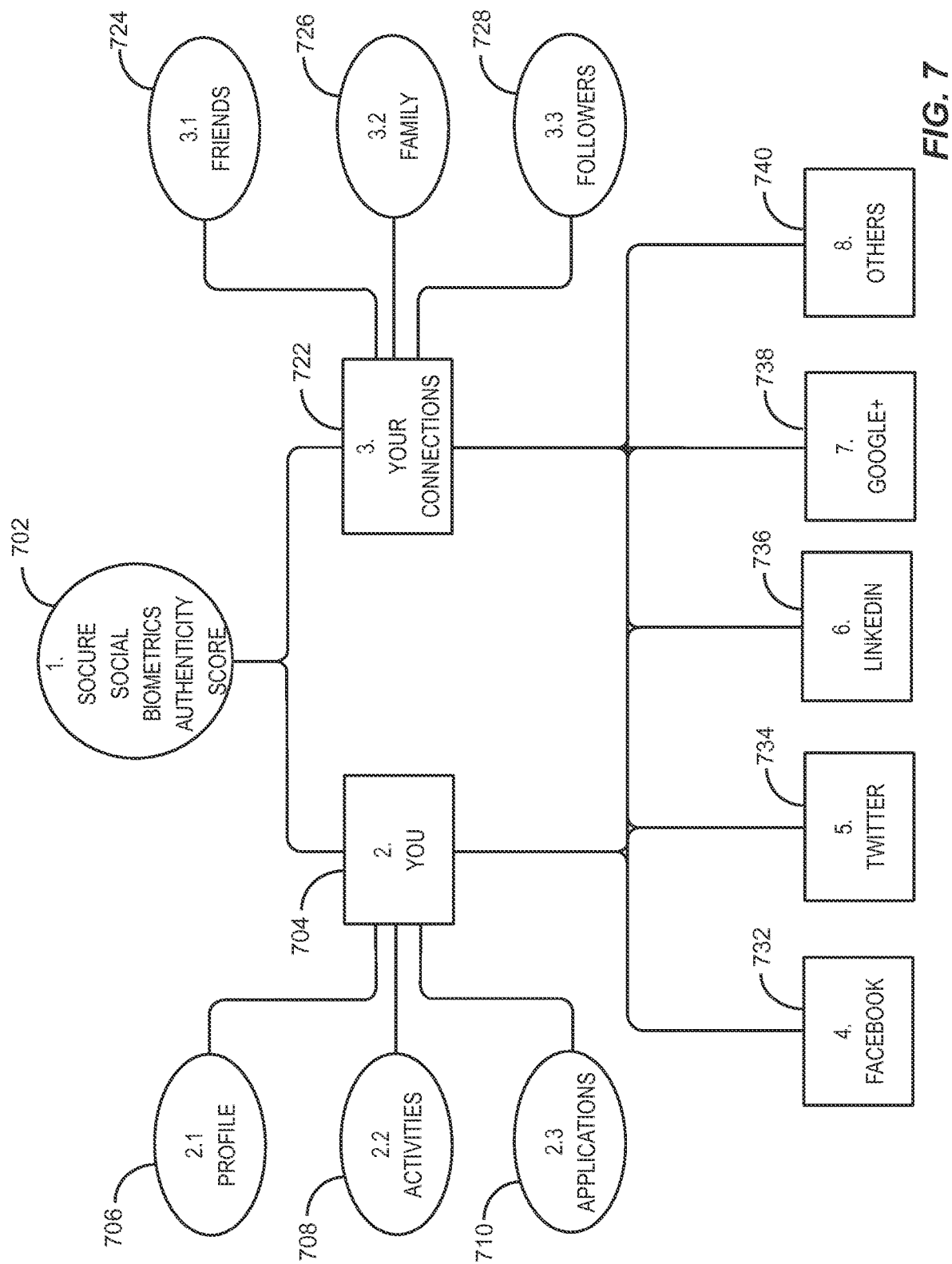
FIG. 7 includes a process flow diagram illustrating one example of how an authenticity score can be calculated in accordance with certain embodiments of the invention.

As applied herein to various embodiments of the invention, the terms "Socure" and "Socure service" may be used to refer to examples of methods, systems, processes, algorithms, and other tools structured or configured in accordance with various embodiments of the invention, including facial evaluation systems and/or risk evaluation systems described herein. FIG. 7 illustrates one example of how a risk evaluation system authenticity score can be calculated. In various embodiments, the Socure system's authenticity score (item 702) for a user can be a normalized weighted score computed based on an weighted factors about the user (items 704-710) and the user's connections (items 722-728) across multiple social networks, professional networks, or other networks (such as Facebook, Twitter, Linkedin, etc.; see items 732-740) to which the user is linked and which are further linked to the Socure system. It can be appreciated that a variety of data may be obtained and processed which are related to such networks, for example and without limitation, contact information, friends, professional connections, birth date, timeline activity, and many others. These data may be scored with a range or ranking of numerical values, for example, on various types of scales (e.g., 1 to 10) in connection with the processing and calculation of the authenticity score.

For a user registered through the Socure system, an algorithm processes the user's profile data (item 706) taking into account the private and public views of the profile attributes to identify sensitive attributes that may be exposed without the user's knowledge. For example, a user's place of birth, name of high school, or favorite pet's name are attributes that are often used to reset forgotten passwords and that could be used to commit account takeover fraud.

The algorithm can process the user's activity feeds and timelines (item 708) calculating the frequency of posts, including calculating a mean and standard deviation for the post frequency. These calculations may then be used to identify the user's burst usage pattern and establish a baseline. The algorithm can also check the identity of the accounts making posts to distinguish between the user's own posts versus posts from the user's connections, for example. The algorithm may then classify each post into categories based on post content (e.g., news item, video, photo, etc.). The algorithm may also calculate the number of social interactions for each item posted (e.g., likes, shares, retweets, etc.). In certain embodiments, the algorithm may also incorporate meta-data about each post such as a location of a user when a post occurred to keep track of the user's frequently traveled locations.

The algorithm, can be programmed to process the user's installed applications for the social networks (item 710) and the attributes of those applications. The profile data (item 706), activity data (item 708) and application data (item 710) may also be used to identify the user's vulnerability, or exposure to security and privacy risks and/or to generate alerts to help the user remedy the vulnerabilities in the social profiles. The algorithm may apply a social network specific model (domain ontology) for a fake account on each of the different types of networks and then compute a profile score for the user based on the positive and negative factors for the user's profile, activities and applications to compute a user score.

The algorithm may also process data associated with the user's social connections, including with the user's friends (item 724), family (item 726), and followers and peers (item 728). The algorithm may be executed based on each social connection to score those connections. The algorithm may then normalize the score to arrive at a connections score.

The algorithm may compute an affinity score by computing the overlap between profile attributes, activities, applications and connections of the user and each friend to calculate the score distance between the user and each connection. The affinity score can be used to bias the algorithm and strengthen the authenticity of the user if the user shares strong connections or weaken the authenticity of the user if the user does not share many factors or data in common with their connections.

In certain embodiments, the user score, connections score, and affinity score may be adjusted to make sure they are positive. Then the scores can be combined to yield an overall measure of authenticity for the user, which can be provided as a score in the range of 0 to 1, for example. This score can be scaled as desired to fit a presentable score range by multiplying a scaling factor (e.g., multiply by 100), and dropping any decimal remainder, to yield an authenticity score for the user. In various embodiments, the facial confirmation score and/or the liveliness check score as calculated by a facial evaluation system, for example, can be combined, in whole or in part, with authenticity scores calculated by a risk evaluation system, for example, to yield an overall measure of user authenticity.

In various embodiments, the algorithm can be configured to compare the user's authenticity score against average score ranges for clusters of people, businesses, or other entities with similar affinity scores, for example. This can be used to determine a mean and standard deviation that can be applied to determine how accurate a score can be considered for a general Socure system user population, thereby gaining an understanding of whether the score is trustworthy or an outlier. This data can be used to improve the fake user model for each network.

Figure 8:
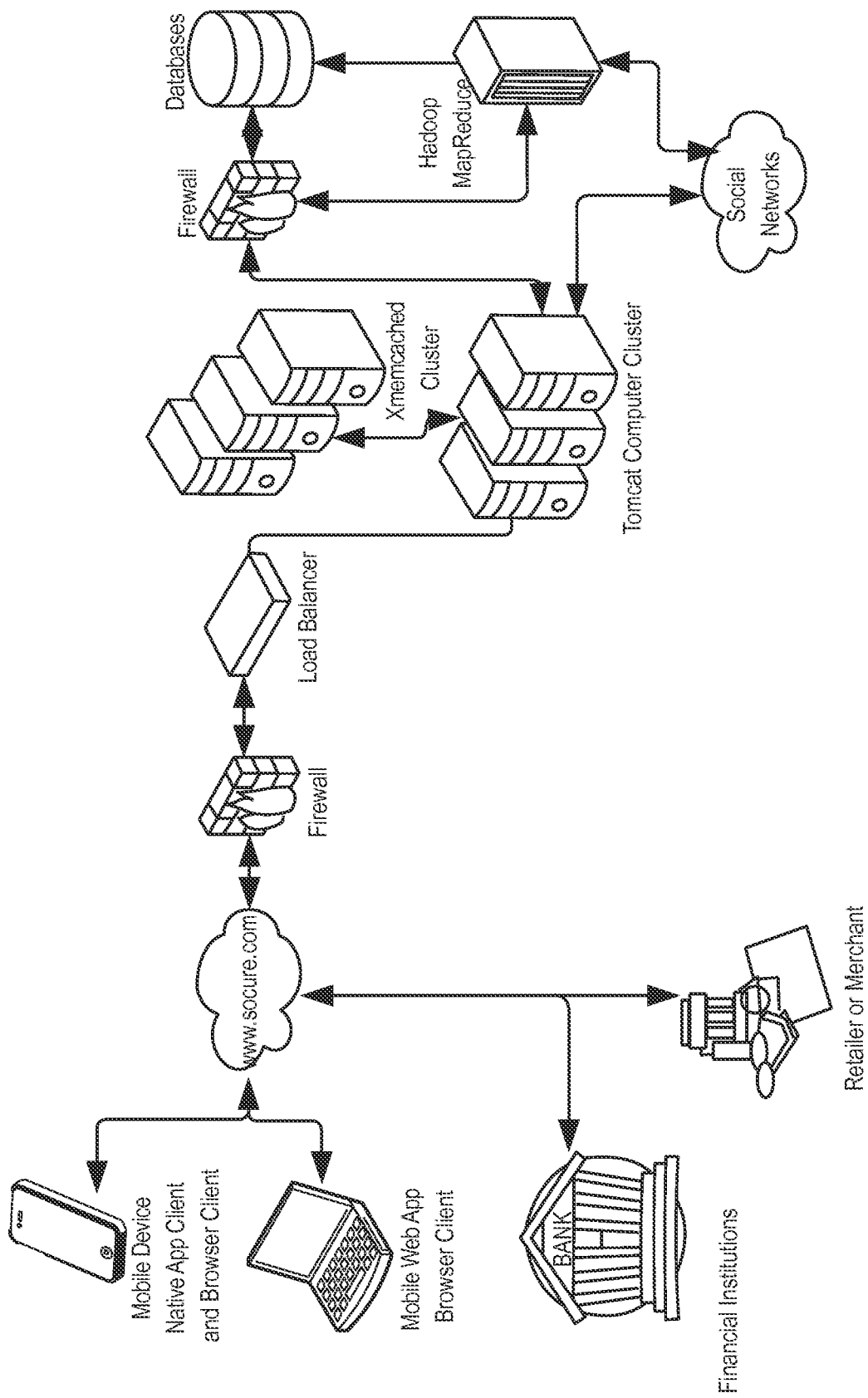
FIG. 8 schematically illustrates one example of a computer system architecture structured in accordance with various embodiments of the invention.

FIG. 8 provides an example of a computer system architecture that can be structured in accordance with various embodiments of the invention. In the example shown, the Socure service can be delivered as a SaaS model (Software as a Service) in a cloud-based computing environment. Tasks or functions performed by the Socure service may include one or more activities performed by a facial evaluation system and/or a risk evaluation system (as described herein). Various enterprises (e.g., financial institutions, merchants, retailers, educational institutions, or other organizations) can access the Socure system by calling the Socure system's web-service APIs, for example. Through the Socure system, enterprises can inject information or data about customers or other users involved in transactions (such as user registration, authentication, authorization, sending payments and remittance, making purchases, etc.).

Figure 9:
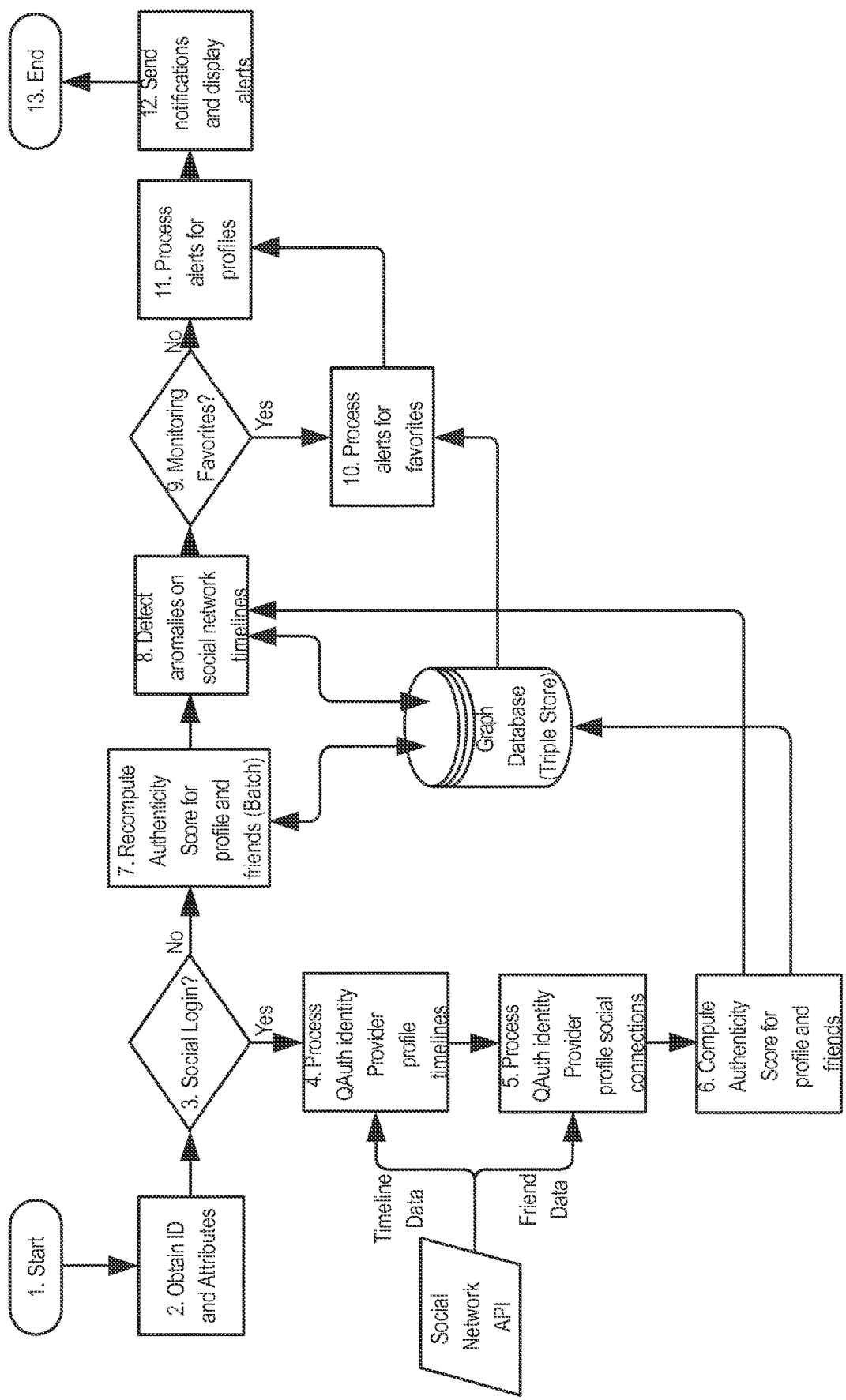
FIG. 9 includes a process flow diagram illustrating various examples of process steps that an evaluation system may execute to verify the authenticity of a user; and, FIG. 10 includes an example of a system architecture for one embodiment of an evaluation system structured in accordance with various embodiments of the invention.

In various embodiments, the Socure system can calculate and generate scores that indicate a degree of authenticity of the different entities participating in transactions, and the risks they may pose with respect to fraud or money laundering, for example. In certain embodiments, the Socure system can process threats in real time across multiple social networks such as Facebook, Twitter, Linkedin, or other networks. The system can then process and store summary data about people and their friends or other entities in a secure database and batch processing system. FIG. 9 shows examples of process steps that the Socure service may take in connection with a risk evaluation system to verify the authenticity of each user and their friends or other contacts. The Socure system can be based on the principle that users' social network usage patterns and their interaction patterns with their friends or other contacts on those networks forms a unique, biometric "who you are" signature for each user.

In various embodiments, the Socure system can apply a social attestation model to verify if a user profile on a social network represents a real or fake person or entity. This analysis can be based on a combination of heuristics, as well as statistical probability measures, which take into account various attributes of the user's social network profiles, timeline activities, and/or interaction with friends and family members in order to arrive at a semantic score for each user profile. In one example of this scoring system, scores can graded from 1 to 10 semantically, where a score of 10 indicates a high degree of authenticity (real person) and score of 1 means low authenticity (fake person).

The Socure service can periodically refresh the authenticity score and summary data for each user based on the latest activity and profile information available. This may be accomplished by using the social network APIs, for example. The Socure system may use the real-time feed APIs of supported social networks to monitor the user subscribed accounts for any activity that is outside the user's normal usage pattern or usage patterns of people similar to the user. The Socure system may also scan the user's installed list of applications and/or the user's security or privacy settings on various social networks to identify where private data may be leaked. In various embodiments, the Socure system can be configured to generate alert notifications for the user based on the threats identified.

In various embodiments, the Socure system may employ semantic or statistical machine learning techniques and algorithms to identify anomalous usage and threat patterns, and/or in conjunction with one or more heuristic rules defined in the system, to generate new knowledge in the system autonomously. This can make the system "smarter" as the amount of user data processed by the system grows over time. As a user's authenticity grows or is improved, the Socure system may allow the user to progress through multiple tiers of service to gain exclusive partner offers and rewards, for example.

Enterprises such as banks, insurance agencies, credit-card agencies, merchants, or retailers may use the Socure system's identity proofing solution on a transactional basis to fight against fraud in the form of identity theft fraud, account take over fraud, payments fraud, money laundering fraud, merchant fraud, and/or many other types of criminal activity. Enterprises also gain the benefit of reduction in false-positives that exist in their proprietary risk and fraud models.

In various embodiments, the Secure system exposes secure JSON/REST and SOAP/XML APIs, for example, for enterprises to call the Socure service on an as-needed basis when certain types of transactions occur. The Socure system can provide an additive signal to enterprise proprietary system signals that indicate fraud or trust risk, for example. The types of transactions that the Socure system may be configured to protect against include registration transactions, login transactions, and/or payment transactions; for example. In another example, the Socure system can extend its model to other types of transactions that depend on identity proofing for non-repudiation purposes based on customer needs. The Socure system's API calls can be secured for enterprises using federated identity and access management standards including SAML, WS-SEC, WS-FED, and/or XACML, among others.

Various embodiments of the invention can be applied to payment service providers and their associated transactions, for example. The Socure system can provide tools to verify the authenticity and integrity of: plastic-card I mobile transactions in real-time (detection and resolution); consumers and institutions (mutual authentication); and/or online transactions (transaction verification). The options offered to consumers to engage in financial transactions continue to grow and change almost daily. Accordingly, the types and amount of information requested from and generated by consumers is also expanding. With the advent of financial technologies such as NFC, mobile payments, P2P lending, social media payments and ACH-less bank transactions, new businesses and new threats have emerged. Various embodiments of the Socure system can be used to execute fraud detection software providing financial institutions with enhanced cost savings and increased ROI from their consumer-based financial transactions. This can be accomplished by providing financial institutions with a social signal that offers a more expansive, more relevant and more valuable data set than prior risk evaluation methods. The Socure system therefore employs a consumer's social graph to proactively protect social data, financial data, and personal data against fraud and identity theft.

Figure 10:
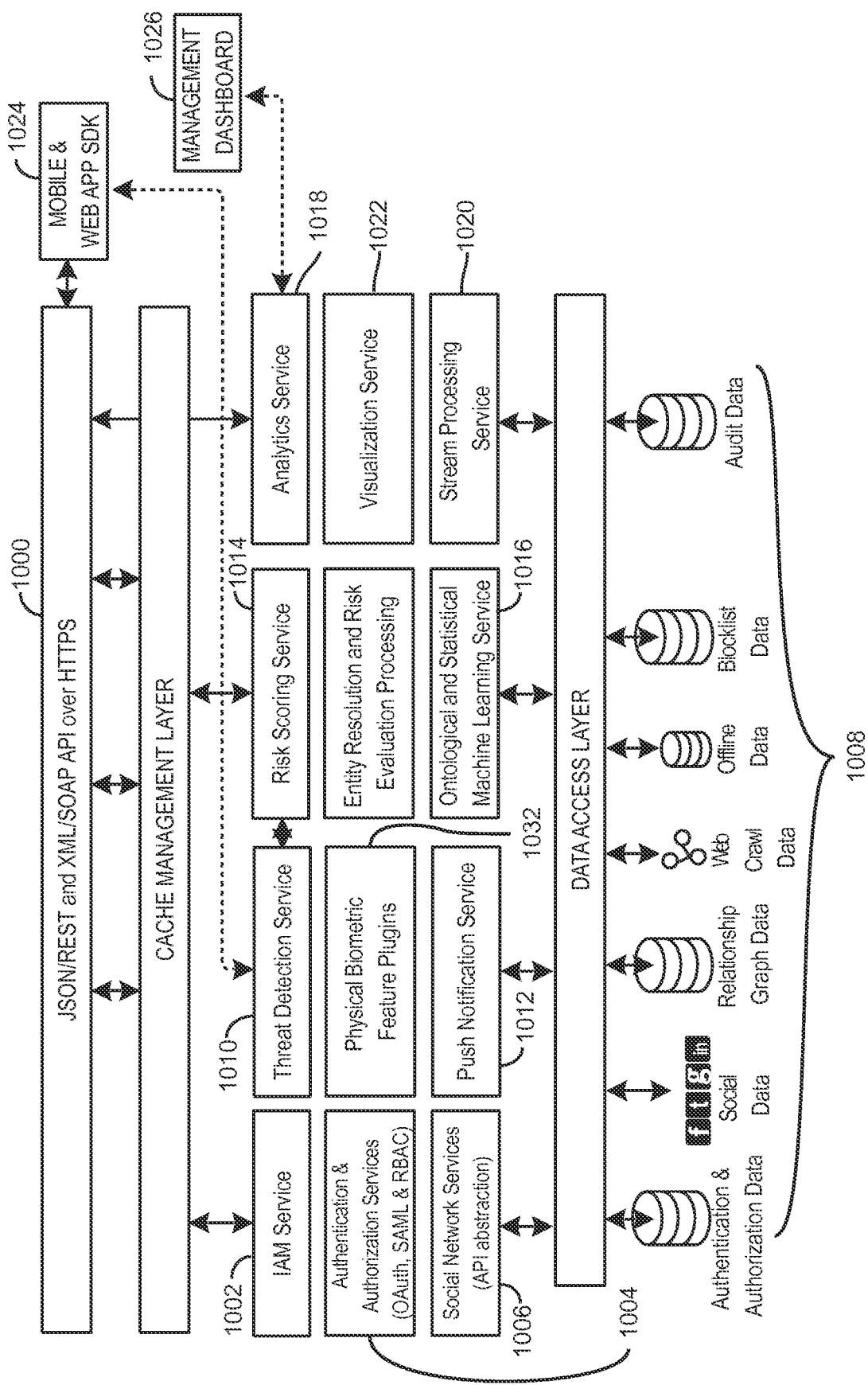

FIG. 10 includes an example of a system architecture for one embodiment of a Socure system structured in accordance with various embodiments of the invention. As shown, the system may include various components configured for performing various functions or tasks for embodiments of the Socure system. Module 1000 depicts a REST/JSON or XML!SOAP protocol which may be used by the system as a protocol specification for exchanging structured information in the implementation of Web Services in computer networks. It relies on Extensible Markup Language (XML) for its message format, and usually relies on other Application Layer protocols, most notably Hypertext Transfer Protocol (HTTP), for message negotiation and transmission. Module 1002 includes a 1 AM service that can be implemented by the system. Identity management (IdM) describes the management of individual identifiers, their authentication, authorization, and privileges within or across system and enterprise boundaries with the goal of increasing security and productivity while decreasing cost, downtime and repetitive tasks.

Module 1004 includes an authentication and authorization services module. OAuth provides a method for clients to access server resources on behalf of a resource owner (such as a different client or an end-user). It also provides a process for end-users to authorize third-party access to their server resources without sharing their credentials (typically, a username and password pair); using user-agent redirections. Security Assertion Markup Language may be used in various embodiments. Module 1004 can be used to implement multi-factor authentication services for the system. Multi-factor authentication is an approach to security authentication that involves the user of a system providing more than one form of verification in order to prove their identity to gain access to the system. Multi-factor authentication takes advantage of a combination of several factors of authentication. These factors may include verification by something a user is (such as facial recognition or other form of biometrics), something the user knows (such as a password), and/or something the user has (such as a smart card or a security token). Due to their enhanced complexity, authentication systems using a multi-factor configuration can be harder to compromise than others that use a single factor.

Module 1006 includes a social network services module which can be programmed to allow users to opt into the Socure service or system. A user may sign into the Socure system by using one or more social network identities.

Various data storage media 1008 can be provided to store data in association with operation of the system. The data storage media can be programmed for storage and retrieval of authentication and authorization data, for example. Certain data storage media 1008 can be programmed for collecting and storing biometric data or biometric identifiers, for example, which are distinctive, measurable characteristics used to label and describe individuals. Biometric identifiers are often categorized as physiological versus behavioral characteristics. A physiological biometric can identify a user by voice, DNA, hand print or behavior. Behavioral biometrics are related to the behavior of a person, including but not limited to: typing, rhythm, gait, and voice, among others.

Module 1010 can be programmed to execute threat management services for the Socure system. This module 1010 may be programmed to implement security and vulnerability management services that provide software tools for aiding in the discovery (and sometimes removal) of vulnerabilities in a computer system. These tools can provide an auditor with an overview of possible vulnerabilities present in the system.

Module 1012 can be used to initiate notification services through the Socure system. The notification services module 1012 offers a scalable server engine on which to run notification applications, with multi-server capability-providing flexibility and scalability for deploying applications. The notification services module 1012 can help with developing and deploying notification applications that generate personalized, timely information to subscribers or other users. The module 1012 can be applied in connection with designing, coding and testing components that make up a robust notification services application, such as notification scheduling, failure detection, retry logic, time zone management, notification grouping, and queue management.

Module 1014 can be programmed to monitor and analyze a user's social network behavioral patterns as well as certain financial patterns to generate various scores which relate to identity authentication and risk assessment. Module 1016 can be programmed to implement a machine learning engine in the system. Machine learning, a branch of artificial intelligence, relates to the construction and study of systems that can learn from data. Various data storage media 1008 can be configured for storage and retrieval of scoring data generated in accordance with various scores calculated by the system. Examples of other modules or components that may be included within embodiments of the Socure system include, without limitation: an analytics service module 1018; a stream processing service module 1020; a visualization engine module 1022; various data storage media 1008 programmed for storage and retrieval of auditing data; a module 1024 for managing mobile web applications or native applications (e.g., iOS, Blackberry, Android, etc.) and for depicting data and scores to users; a graphical user interface module 1026 depicts data, such as dashboard information or other user interface screens; and/or potentially other modules. Module 1032 can be programmed to process facial recognition data and/or to perform facial confirmation or liveliness check analyses, for example, as described above.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is the intent of the inventors that the various embodiments of the invention described herein should be practiced in appropriate legal and regulatory operating environments. Various embodiments of the invention are intended to be structured for compliance with applicable local, state, and federal laws and regulations.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that a sufficient understanding of the present invention can be gained by the present disclosure, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware; hardware, or any reasonable combination thereof.

Moreover, the processes associated with the present embodiments may be executed by programmable equipment, such as computers. Software or other sets of instructions that may be employed to cause programmable equipment to execute the processes may be stored in any storage device, such as a computer system (non-volatile) memory. Furthermore, some of the processes may be programmed when the computer system is manufactured or via a computer-readable memory storage medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "computing apparatus," "component," or "computer processor" may be, for example and without limitation, a processor, microcomputer, minicomputer, server, mainframe, laptop, personal data assistant (PDA), wireless e-mail device, smart phone, mobile phone, electronic tablet, cellular phone, pager, processor, fax machine, scanner, or any other programmable device or computer apparatus configured to transmit, process, and/or receive data. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random-access memory), PROM (programmable ROM), EEPROM (electrically erasable PROM) and/or other computer-readable memory media. In various embodiments, a "host," "engine," "loader," "filter," "platform," or "component" may include various computers or computer systems, or may include reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++; C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), an SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as described and claimed herein.

The invention claimed is:

1. A computer-implemented method, comprising:
detecting, via a facial recognition software application running on an electronic processor, an anatomical change of a user;
calculating, via the facial recognition software application running on the electronic processor, a liveliness score based on a synchronization between the anatomical change and a feature displayed via the facial recognition software;
calculating, via the facial recognition software application, a first score for the user based on the calculated liveliness score;
determining that the first score is insufficient for authentication of the user; and
combining the first score with a second score in response to determining that the first score is insufficient for authentication of the user, the second score being a normalized weighted score calculated based on social network connections of the user.

2. The method of claim 1, wherein the anatomical change includes movement of at least one lip of the user, and the feature displayed via the facial recognition software is text displayed on a screen of a compute device.

3. The method of claim 1, wherein the anatomical change is associated with a recital of a phrase by the user.

4. The method of claim 1, wherein the anatomical change includes at least one of: an eye blink, an eye movement, a head movement, a lip movement, a hand movement, or an arm movement.

5. The method of claim 1, wherein the detecting the anatomical change is performed within a predefined time frame of a video.

6. The method of claim 1, wherein the detecting the anatomical change is performed within a predefined time frame of an animation segment.

7. A system, comprising:
a processor; and
a memory operably coupled to the processor and storing instructions executable by the processor to:
detect, via a facial recognition software application, an anatomical change of a user;
calculate, via the facial recognition software application, a liveliness score based on a synchronization between the anatomical change and a feature displayed via the facial recognition software;
calculate, via the facial recognition software application, a first score for the user based on the calculated liveliness score; and
combine the first score with a second score if the first score is determined insufficient for authentication of the user, the second score being a normalized weighted score calculated based on social network connections of the user.

8. The system of claim 7, wherein the anatomical change includes movement of at least one lip of the user, and the feature displayed via the facial recognition software is text displayed on a screen of a compute device.

9. The system of claim 7, wherein the anatomical change is associated with a recital of a phrase by the user.

10. The system of claim 7, wherein the anatomical change includes at least one of: an eye blink, an eye movement, a head movement, a lip movement, a hand movement, or an arm movement.

11. The system of claim 7, wherein the instructions to detect the anatomical change include instructions to detect the anatomical change within a predefined time frame of a video.

12. The system of claim 7, wherein the instructions to detect the anatomical change include instructions to detect the anatomical change within a predefined time frame of an animation segment.

13. A non-transitory computer-readable medium storing processor-executable instructions to:
detect, via a facial recognition software application, an anatomical change of a user;
calculate, via the facial recognition software application, a liveliness score based on a synchronization between the anatomical change and a feature displayed via the facial recognition software;
calculate, via the facial recognition software application, a first score for the user based on the calculated liveliness score; and
combine the first score with a second score if the first score is determined insufficient for authentication of the user, the second score being a normalized weighted score calculated based on social network connections of the user.

14. The computer-readable medium of claim 13, wherein the anatomical change includes movement of at least one lip of the user, and the feature displayed via the facial recognition software is text displayed on a screen of a compute device.

15. The computer-readable medium of claim 13, wherein the anatomical change is associated with a recital of a phrase by the user.

16. The computer-readable medium of claim 13, wherein the anatomical change includes at least one of: an eye blink, an eye movement, a head movement, a lip movement, a hand movement, or an arm movement.

17. The computer-readable medium of claim 13, wherein the instructions to detect the anatomical change include instructions to detect the anatomical change within a predefined time frame of a video.

18. The computer-readable medium of claim 13, wherein the instructions to detect the anatomical change include instructions to detect the anatomical change within a predefined time frame of an animation segment.

* * * * *